3,325,108
ADJUSTING MECHANISM FOR GYRATORY
CRUSHERS
Hansjörg Balmer, Langenthal, Bern, Switzerland, and
Rudolph J. Gasparac, Milwaukee, Wis., assignors to
Nordberg Manufacturing Company, Milwaukee, Wis.,
a corporation of Wisconsin
Original application Nov. 14, 1961, Ser. No. 152,222, now
Patent No. 3,140,835, dated July 14, 1965. Divided
and this application Apr. 8, 1964, Ser. No. 364,874
5 Claims. (Cl. 241—290)

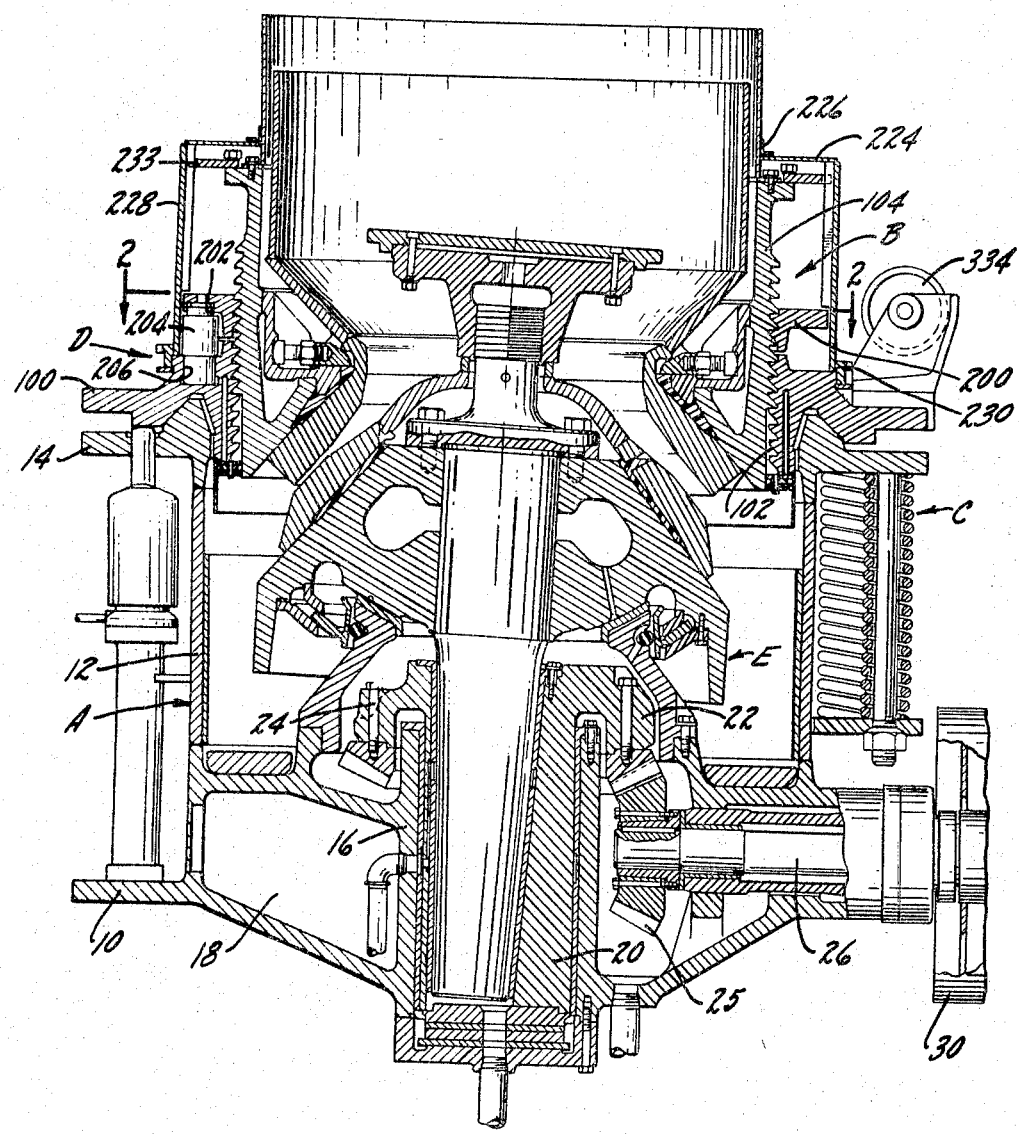

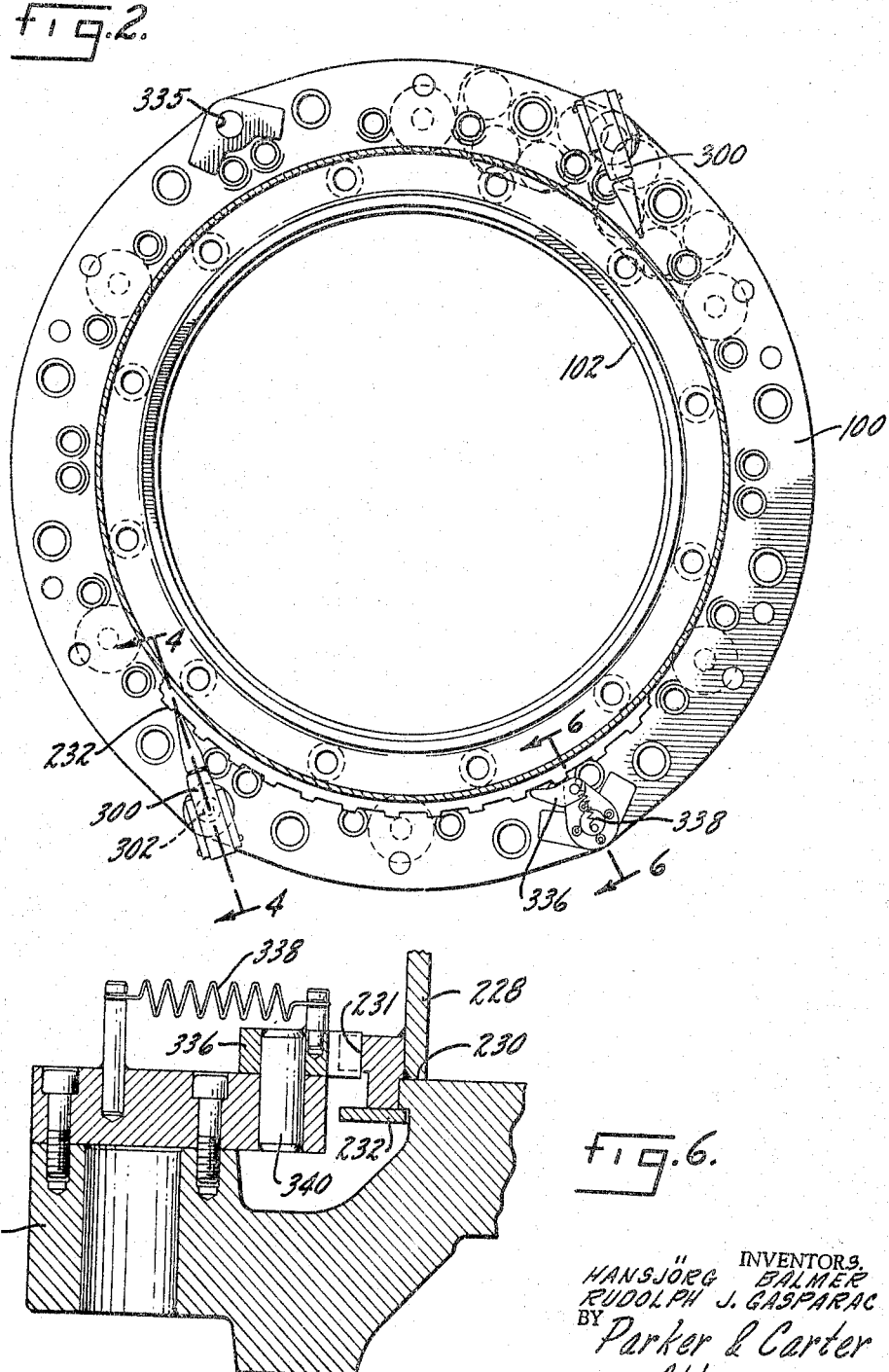

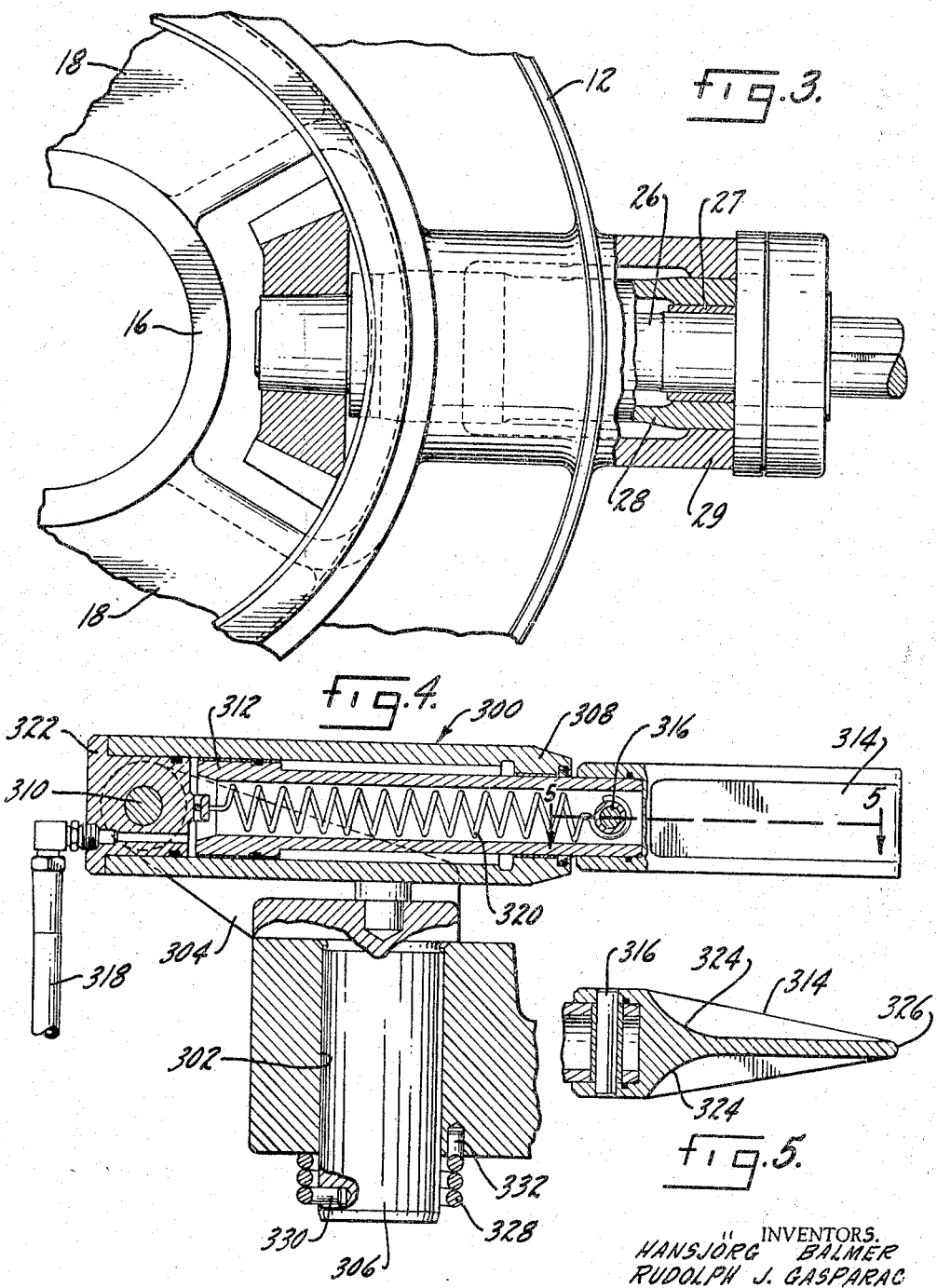

This is a division of Ser. No. 152,222 filed Nov. 14, 1961, now Patent No. 3,140,835 issued July 14, 1964.

This invention is in the field of material reduction machines and is concerned, among other things, with an improved gyratory crusher.

A primary object of the invention is an improved gyratory crusher which is efficient in use.

Another object is a power adjustment for the bowl of a gyratory crusher.

Another object is an improved ram structure for adjusting the bowl of a gyratory crusher.

Other objects will appear from time to time in the ensuing specification and drawings in which:

FIGURE 1 is a vertical section of a gyratory crusher;

FIGURE 2 is a section along line 2—2 of FIGURE 1, with parts removed for clarity;

FIGURE 3 is a top plan view, partly in section, of the frame and drive;

FIGURE 4 is a section along line 4—4 of FIGURE 2, on an enlarged scale;

FIGURE 5 is a section along line 5—5 of FIGURE 4; and

FIGURE 6 is a section along line 6—6 of FIGURE 2 on an enlarged scale.

In FIGURE 1, a crusher has been shown generally including the following main parts, a main frame A which supports a bowl structure B releasably held on the main frame by a release mechanism C and arranged to be adjusted by an adjustment mechanism D. The main frame also supports a crushing head E defining a crushing cavity with bowl.

The main frame A includes a base flange 10 with an upstanding housing 12 and a supporting flange 14 for the bowl structure at the upper end. The base flange is connected to a center hub 16 by a web structure 18. The center hub supports an eccentric 20 which has a suitable counterweight 22 at its upper end overhanging the upper end of the center hub and connected to a ring gear 23 by bolts 24 or the like, which in turn is driven by a pinion 25 on a drive shaft 26 which in turn may be driven by a belt and pulley arrangement or any suitable means, not shown.

The drive shaft may be supported by bearings 27 in a sleeve 28 suitably held in a boss or journal 29 which is a part of the frame with a pulley 30 or the like at the outer end of the shaft.

The bowl structure B may include an adjustment or tilting rang 100 screwthreaded as at 102 to a bowl 104.

The release mechanism C may include a locking ring 200 screwthreaded to the bowl and disposed above the adjustment ring. The locking ring may have a plurality of downwardly opening individual sockets 202 on its lower surface for clamping units 204. Each clamping unit may be positioned in a corresponding upwardly opening socket 206 in the adjustment ring.

The threads between the bowl, adjustment ring and locking ring may be protected by a top cap 224 which is sealed at 226 to the bowl extension with a skirt 228 which rests at 230 on the adjustment ring. A torque ring 231 may be connected to the outside of the top cap and releasably held on the adjustment ring by a plurality of levers 232, shown in FIGURE 6, which pivot under a flange on the adjustment ring. The upper end of the bowl may be keyed to the top cap at 233 so that when the top cap is rotated, the bowl will be rotated and, at the same time, may move up or down.

As shown in FIGURES 2 and 4, the adjustment mechanism D may take the form of two rams 300, shown as mounted on the adjustment ring at 302, 180° apart, although it might be otherwise. Each includes a yoke 304 with a stub 306 extending from the lower end through an opening in the adjustment ring. The ram cylinder 308 is pivoted to the ears of the yoke at 310. The piston 312 of the ram has a nose 314 on the outer end connected to it by a pin 316. A suitable hydraulic connection 318 is connected to the rear of the cylinder to supply high pressure fluid as desired, to cause the piston to extend. A suitable spring 320 may be connected at one end to the piston pin 316 and at its other end to the cylinder plug 322 so that the ram will have a power excursion and a spring return.

In FIGURE 5, the nose of the ram is shown as being concave or indented on each side thereof, as at 324, so that the forward edge 326 will properly engage the teeth on torque ring 231.

The lower end of the yoke pin extends below the adjustment ring and is surrounded by a coil spring 328 or the like, one end of which is connected to the pin at 330 and the other end to the adjustment ring at 332. The spring tends to bring the ram to a generally radial position on the main frame. Thus, when the rams are disposed to rotate the bowl either clockwise or counterclockwise in FIGURE 2, they will always be held in against the teeth of the torque ring. To reverse the direction of rotation, the ram is lifted up about its pivot 310 until it clears the ouside of the top cap, then manually rotated and lowered on the other side. But in either position, the spring 328 will hold it in against the torque ring.

The rams may be fast enough for normal adjustment. For changing worn out liners, which requires backing the bowl all the way out, they may be far too slow. Therefore, a sheave 334, shown in FIGURE 1, may be mounted on the adjustment ring, at 335 in FIGURE 2, to pivot, one way or the other, so that the bowl may be rapidly turned up or down by a cable and crane, if desired. To prevent the bowl from rotating during crushing, a lock 336 in the form of a pawl is held by a spring 338 against the torque ring and pivoted on the adjustment ring at 340. The direction of rotation of the head is such that it tends, during normal crushing, to rotate the bowl up. The lock prevents such rotation. When the rams adjust the bowl down, the teeth of the torque ring merely ratchet by the lock 336. When the mantle and liner are worn out and need to be replaced, the lock 336 may be pivoted over center away from the torque ring while the bowl is being turned up.

It will be realized that whereas a practical and operative device has been described and claimed, nevertheless many changes may be made in the size, shape, number and disposition and relation of parts without departing from the spirit of the invention. It is therefore wished that the description and drawings be taken as in a broad sense illustrative or diagrammatic rather than at limiting to the precise showing.

The use, operation and function of the invention are as follows:

A gyratory crusher is provided with a mechanism for automatic and controlled adjustment.

When the bowl is to be adjusted, the rams index the bowl to bring the cavity back to size. Also, during crushing the peripheral bowl load is on a fixed stop and not on the rams.

The rams provide for easy adjustment to rotate the bowl in either direction. Only one man is required to pivot the ram up in its yoke support and then turn the ram and yoke from one side to the other. The spring automatically centers or pulls the ram toward the bowl to engage the torque ring. The ram has been shown as hydraulic, but it might be air operated or otherwise. Also, two rams have been shown, but more or less might be used. It is preferred that two be used, approximately 180° apart, so that the inward component of ram thrust from one will be counterbalanced against the other. Thus, the bowl has no tendency to bind due to ram thrust. The rams have been shown with a power thrust and spring return but they might be double acting.

We claim:

1. For use in rotatably adjusting the bowl of a gyratory crusher, a ram structure including a yoke adapted to be mounted generally upright on the adjustment ring of the crusher, a ram supported on the yoke and freely pivoted thereto about a generally horizontal axis so that the extended end of the ram may be freely raised and lowered, means on the yoke for normally supporting the ram in a generally horizontal position, and means for rotatably biasing the yoke toward a position where the ram would be generally radially disposed on the crusher.

2. The structure of claim 1 further characterized by and including a stub shaft depending from the yoke adapted to be mounted in an opening in the adjustment ring and extending slightly below it, and a spring connected to the lower end of the stub shaft and adapted to be connected to the adjustment ring to bias the ram inwardly toward the crusher at all times.

3. In a gyratory crusher, a main frame, a bowl mounted in the main frame for rotary adjustment thereon, and at least one ram structure mounted on the main frame opposite the bowl and having a fluid operated ram constructed to apply a peripheral thrust to the bowl to rotate it for adjustment, the ram structure having a double pivot, one generally vertical and the other generally horizontal, the vertical pivot being spring biased to hold the ram in against the bowl at all times, the horizontal pivot being free so that the ram may be freely moved out of engagement with the bowl.

4. The structure of claim 3 further characterized by and including at least two such ram structures on the main frame, equally spaced from each other so that the radial components of their thrusts will counterbalance each other, thereby preventing the bowl from binding during rotary adjustment of the bowl.

5. The structure of claim 3 further characterized by and including a spring biased locking pawl mounted on the main frame and engaging the bowl and constructed to prevent rotation of the bowl in one direction and allowing rotation in the other direction.

References Cited

UNITED STATES PATENTS

| | | | |
|---|---|---|---|
| 2,269,835 | 1/1942 | Wallace | 254—93 |
| 3,009,660 | 11/1961 | Symons | 241—290 |
| 3,096,077 | 7/1963 | Forsyth | 254—93 |

WILLIAM W. DYER, Jr., *Primary Examiner.*

H. F. PEPPER, Jr., *Assistant Examiner.*